(12) United States Patent
Silva et al.

(10) Patent No.: US 9,306,486 B2
(45) Date of Patent: Apr. 5, 2016

(54) SYSTEM AND METHOD FOR CONTROLLING THE STROKE AND OPERATION AT RESONANCE FREQUENCY OF A RESONANT LINEAR MOTOR

(75) Inventors: Douglas Pereira da Silva, Joinville (BR); Paulo Sérgio Dainez, Campinas (BR); Renê Adriano Weise, Joinville (BR)

(73) Assignee: Whirlpool S.A., São Paulo-SP (BR)

( * ) Notice: Subject to any disclaimer, the term of this patent is extended or adjusted under 35 U.S.C. 154(b) by 57 days.

(21) Appl. No.: 14/238,665

(22) PCT Filed: Aug. 10, 2012

(86) PCT No.: PCT/BR2012/000286
§ 371 (c)(1),
(2), (4) Date: May 23, 2014

(87) PCT Pub. No.: WO2013/026115
PCT Pub. Date: Feb. 28, 2013

(65) Prior Publication Data
US 2014/0340003 A1    Nov. 20, 2014

(30) Foreign Application Priority Data
Aug. 19, 2011  (BR) ..................... 1103776

(51) Int. Cl.
| | | |
|---|---|---|
| H02P 25/02 | (2006.01) | |
| F04B 35/04 | (2006.01) | |
| F04B 49/06 | (2006.01) | |
| H02K 33/16 | (2006.01) | |

(52) U.S. Cl.
CPC .............. *H02P 25/027* (2013.01); *F04B 35/04* (2013.01); *F04B 35/045* (2013.01); *F04B 49/06* (2013.01); *F04B 49/065* (2013.01); *H02K 33/16* (2013.01); *F04B 2201/0206* (2013.01); *F04B 2203/0401* (2013.01); *F04B 2203/0403* (2013.01); *F04B 2203/0404* (2013.01)

(58) Field of Classification Search
CPC .................................................. H02P 25/027
USPC .................................. 318/128, 127, 126, 119
See application file for complete search history.

(56) References Cited

U.S. PATENT DOCUMENTS

| | | | |
|---|---|---|---|
| 5,897,296 A | 4/1999 | Yamamoto et al. | |
| 6,774,588 B2* | 8/2004 | Ibuki et al. | 318/119 |
| 8,143,817 B2* | 3/2012 | Izumi | H02K 33/14 |
| | | | 310/15 |
| 2009/0280015 A1 | 11/2009 | Lillie et al. | |
| 2011/0008191 A1 | 1/2011 | Lilie et al. | |

OTHER PUBLICATIONS

International Search Report of PCT/BR2012/000286 dated Oct. 12, 2012.

* cited by examiner

*Primary Examiner* — David S Luo
(74) *Attorney, Agent, or Firm* — Brian J. Colandreo; Michael T. Abramson; Holland & Knight LLP

(57) ABSTRACT

Linear compressor comprising a resonant linear motor (4) having a stator (9) and a linear displacer (3), the linear motor (4) cooperating with a resonant spring (2) that is driven by the linear displacer (3) at one of the ends of the resonant spring (2) with the opposite end of the resonant spring (2) cooperating with a mechanical actuation element (1). A variation sensor of magnetic flux (5) cooperates with the resonant spring (2). Said variation sensor of magnetic flux (5) comprising a fixed part (7) and a movable part (6), the movable part (6) coupled to the end of the resonant spring (2) opposite to the end cooperating with the linear displacer (3). The variation sensor of magnetic flux (5) is the sole means required to determine the displacement amplitude and the frequency of oscillation of the displacer (3) of the linear motor (4). Corresponding method for controlling the stroke in such a linear compressor.

12 Claims, 9 Drawing Sheets

SYSTEM AND METHOD FOR CONTROLLING THE STROKE AND OPERATION AT RESONANCE FREQUENCY OF A RESONANT LINEAR MOTOR

RELATED APPLICATIONS

The subject application is a U.S. National Stage Application of International Application No. PCT/BR2012/000286, filed on 10 Aug. 2012, which claims the priority of Brazil Patent Application No.:PI1103776-8, filed on 18 Aug. 2011, the contents of which are herein incorporated by reference in its entirety.

FIELD OF THE INVENTION

The present invention relates to a system and method for controlling the stroke of a resonant linear motor of any kind and in particular those used in vapor compression systems used in refrigeration equipment or heat pumps.

BACKGROUND OF THE INVENTION

As is known in the art and with reference to the enclosed FIG. 9 illustrates a compressor attached to the current state of the art, reciprocating piston compressors generate pressure by compressing a gas within a cylinder 30 through the axial movement of a piston 29, and the gas of the low pressure side (suction or evaporation pressure) enters in the interior of the cylinder through a suction valve 32, is compressed within the cylinder 30 by movement of piston 29 and then leaves the cylinder by a discharge valve 33, moving to the high pressure side (discharge or condensation pressure).

In the case of resonant linear compressors, the piston is driven by a linear actuator formed by a support 34 and magnets 35 (which can be actuated by one or more coils 36), and one or more springs 38, 39 connect the movable part (piston, supports and magnets) to the fixed part (cylinder, stator 44, coil, head 31 and structure 45). The movable parts and the springs form the resonant assembly of the compressor.

Then, the resonant assembly driven by linear motor has the function to develop a linear reciprocating motion, causing the movement of the piston inside the cylinder to exert a compression action of the gas admitted by the suction valve, until the point at which it can be discharged through the discharge valve to the high pressure side.

The amplitude of the operation of the linear compressor is regulated by the balance between the power generated by the motor and the power consumed by the compression mechanism, plus the losses generated in this process. To achieve maximum thermodynamic efficiency and maximum cooling capacity, it is necessary that the maximum displacement of the piston approaches the maximum possible to the end of stroke (head), thus reducing the dead volume of gas in the compression process.

To enable this process, it is necessary that the stroke of the piston be known with great accuracy to avoid the risk of impact of the piston with the end of the stroke (head 31), since this impact can generate from acoustic noise and loss of efficiency to compressor failure. Thus, the higher the error in the estimation measurement of the position of the piston, the greater will be the safety coefficient necessary between the maximum displacement and the end of the stroke, so that it is possible to safely operate the compressor—leading to loss of performance of the product.

However, if it is necessary to reduce the cooling capacity of the compressor due to less need of the refrigeration system, it is possible to reduce the maximum stroke of the piston operation which consequently reduces the power supplied to the compressor thus, it is possible to control the capability of the refrigeration compressor, obtaining a variable capacity.

Another important feature of the resonant linear compressors is the driving frequency. These systems are designed to operate at resonant frequency of the system mass/spring, a condition in which efficiency is maximal, where the mass (m) is the sum of the mass of the components of the movable part (piston, support and magnets), and the equivalent spring (KT) is the sum of the resonant spring of the system (KML) with the gas spring generated by the compression force of the gas (KG) which has a behavior similar to a variable and nonlinear spring, which depends on the evaporation and condensation pressure of the cooling system and also the gas used in the system. The resonance frequency (fR) can be calculated from equations (1) and (2) given below:

$$K_T = K_{ML} + K_G \quad (1)$$

$$f_R = \frac{1}{2 \cdot \pi} \sqrt{\frac{K_T}{m}} \quad (2)$$

Due to the portion of gas spring (KG)—which is unknown, nonlinear and variable throughout the operation—it is not possible to calculate the resonance frequency with the precision necessary to optimize the efficiency of the compressor. In another alternative way of adjusting the resonant frequency, it is applied a variation in the driving frequency until it is in the point of maximum power for a constant current. This method is simple and easy to implement, but its drawback is the fact that it is necessary to disrupt the system periodically to detect the resonant frequency.

When the system operates in resonant frequency, the motor current is in quadrature with the displacement or the motor current is in phase with the back electromotive force of the motor (FCEM), as FCEM is proportional to the derivative of displacement. This method is more accurate, but it requires the measurement of the current phase and the displacement phase or of FCEM, having the disadvantage of requiring the installation of sensors of position or speed.

An alternative construction to the resonating linear compressor is proposed in the patent application PI 0601645-6 which aims to reduce vibration of the compressor and also the size and weight, wherein in this construction the piston is connected to the actuator by the resonant spring generating two movable parts in relation to the structure of the compressor, thereby increasing the difficulty of controlling the mechanical engine due to the need to monitor and control two movable parts. However, also for this compressor with two movable parts it is necessary to monitor the phase of the actuator speed in relation to the current phase and the maximum stroke of the piston.

Other proposed solutions to obtain the stroke of the compressor involve the use of position sensors, such as those described in the following documents:

PI 0001404-4 (EMBRACO)—describes a sensor impeller, which has the disadvantages of the difficulty of insulation and noise of the electrical contact;

PI 0203724-6 (EMBRACO)—describes an inductive sensor mounted on the valves board, which allows to measure the distance piston plate directly on top of the piston. It is a solution of high precision, but requires a space for installing the sensor in the valves board and, moreover, has a higher cost and accurate calibration;

PI 0301969-1 (EMBRACO)—provides the use of PZT sensor, operating similar to an accelerometer; which has a good sensitivity for detection of impact, but it has a greater error in the measurement of the position;

PI PI 0704947-1 and 0705049-6 (both of EMBRACO)— provides a coil installed inside the engine to monitor the movement of the magnet of the linear actuator; it needs a time without current in the engine, in the region of measurement of the maximum stroke, which thereby limits the maximum power and flexibility of control of the equipment.

U.S. Pat. No. 5,897,296 and JP 1,336,661 (Sanyo)—use sensor, A/D converter and discrete/digital signal, and subsequently interpolated to determine the maximum forward position of the piston. With this solution, it is possible to achieve a high degree of accuracy, but the measurement is not made at the site of interest (distance piston/plate), whereby there is the need of considering the tolerances of the mounting position of the transducer and possible need of calibration. It also has the disadvantage of presenting a high cost;

U.S. Pat. No. 5,897,269 (Matsushita)—performs the control with position sensor, it presents possible need for calibration and high cost.

All the above solutions have been developed for a system with a movable part and using the position sensor and thus are not suitable for the compressor with two movable parts.

Other solutions that do not use the position sensor are described in documents:

U.S. Pat. No. 5,342,176, U.S. Pat. No. 5,496,153, U.S. Pat. No. 4,642,547 (Sunpower) and U.S. Pat. No. 6,176,683, KR 96-79125 and KR 96-15062 (LG)—They carry out the calculation of speed from the electric equation, and with speed the stroke is calculated; this method is not accurate because it considers the dynamics of the compressor and does not estimate the offset of the stroke;

WO 00079671 (F & P)—the operating limit is calculated from a table between the resonance frequency and the evaporation temperature; as a disadvantage, this method does not have good precision and requires a temperature or pressure sensor.

WO 03044365 (F & P)—the limit of operation is obtained by detecting the impact, by varying the resonance frequency of the compressor, this method has the disadvantage of generating acoustic noise and oscillation of the stroke at maximum capacity.

The above solutions without position sensor, were also designed for a system with a movable part, and thus are not suitable for the compressor with two movable parts.

Solutions to the problem of the drive frequency are suggested in the documents indicated below:

WO 00079671A1 (F & P)—uses detecting back electromotive force of the motor to adjust the resonance frequency. This technique has the disadvantage of needing a minimum time without current in order to detect the zero crossing of FCEM; thus affecting the maximum power and the efficiency by the distortion in the waveform of the current.

U.S. Pat. No. 5,897,296 (Matsushita)—Control with position sensor and control of frequency to minimize the current. This technique has the disadvantage of requiring to disturb the system periodically to adjust the driving frequency—which can impair product performance.

U.S. Pat. No. 6,832,898 (Matsushita)—Control of the operation frequency by the maximum power for a constant current. This technique uses the same principle of the previous citation, so has the same disadvantage of requiring to disturb the system periodically.

U.S. Pat. No. 5,980,211 (Sanyo)—Control with sensor and control of frequency by the phase with the position. This method has the disadvantage of needing a position sensor.

In short, in the current state of the art it is necessary to use two position sensors to control the compressor with two movable parts, and control techniques without sensors were not developed for this type of compressor.

OBJECTIVES OF THE INVENTION

It is therefore an objective of this present invention to provide a method and a device for controlling a resonant linear actuator with two movable parts which makes it possible to use only a single sensor, to control simultaneously the amplitude of the stroke of operation of a movable part (which is coupled to a linear displacer via a resonant spring) and the operation frequency of the displacer (which is the other movable part) in phase with the current applied to the motor of the linear actuator, resulting in a drive that enables the operation of this system in the frequency of mechanical resonance.

Additionally, it should be clarified that one of the objectives of the present invention is to provide a method and apparatus for controlling a resonant linear actuator whose sensor performs the detection of movement of the piston of the equipment and not of its linear displacer—as it occurs in similar techniques known in the current state of the art.

SUMMARY OF THE INVENTION

The above objectives are achieved by means of a system of control of the stroke and operation at resonance frequency of a resonant linear motor, and said linear motor comprising a stator and a linear displacer, the motor being cooperative with a resonant spring which is driven by the linear displacer at one of the ends having the opposite end cooperative with mechanical actuation element, said system comprising: a variation sensor of magnetic flux cooperating with the resonant spring, wherein the variation sensor of magnetic flux is comprised of a fixed part and a movable part, and a movable portion coupled to the end of the resonant spring opposite to the cooperating end with the linear displacer, and means to allow that a variation sensor of magnetic flux be the sole means required to determine the displacement amplitude and frequency of oscillation a displacer of linear motor.

Preferably, the variation sensor of magnetic flux comprises a coil supported by a support base, and a magnet cooperating with the coil, and said magnet generates an induced voltage in the coil.

Also according to a preferred embodiment of the invention, the movable part of the variation sensor of magnetic flux comprises a magnetic united to one of the ends of a rod whose opposite end is fixed to a fastening means which interconnects the resonant spring to the element of mechanical actuation.

The system of the present invention can also perform the control of the stroke of mechanical operation element by using the signal of the variation sensor of induced magnetic flux, and the actuating element can be a piston.

The present invention also contemplates a method of controlling stroke and operation at resonance frequency of a resonant linear motor, which comprises performing the following steps:

generation by the linear displacer of a force on the end of the resonant spring with which the linear displacer cooperates, so that when the resonant spring has the end cooperating with the linear displacer displaced in a direction, its opposite end moves towards the opposite direction;

receiving the signal from a variation sensor of magnetic flux that has its movable part coupled to the resonant spring at the opposite end of the linear displacer;

performing the reading the current of the linear motor;

controlling the operation at frequency of mechanical resonance from the signal generated by the variation sensor of magnetic flux and the signal of current of the linear motor;

controlling the stroke of linear actuator from the signal generated by the variation sensor of magnetic flux and the current signal of the linear motor, simultaneously controlling the operation at frequency of mechanical resonance;

This control method comprising an evaluation of the delay between the signal of the variation sensor of magnetic flux and the signal of current of the linear motor.

Said control method, based on the evaluation of the delay of the signals of the variation sensor of magnetic flux and of the current of the linear motor, may also comprise the variation in driving frequency of the current of the linear motor until the signal of the variation sensor of magnetic flux becomes in phase with the signal of the current of the linear motor—preferably, until the signals are ideally delayed of 0 or 180 degrees, or near these values.

This method is also characterized by the fact that, according to a law of adjustment, it feeds back information to the operation frequency to adjust the stroke information for various operating frequencies, since changing the frequency of operation by control means, one can feed back the system and reaching a new stroke information on the previous one correcting the time of oscillation.

The control method may also comprise the generation of a digital signal which is related to the displacement of electric phase between the signal of the variation sensor of magnetic flux and the current signal of the linear motor, or the use of processors with a high rate of acquisition and analogue-digital conversion for establishing comparison references of the phases, or any other means for evaluating the displacement of electric phase between the signal from a variation sensor of magnetic flux and the current signal of the linear motor.

BRIEF DESCRIPTION OF DRAWINGS

The present invention will be hereinafter more fully described based on drawings.

The figures show.

DETAILED DESCRIPTION OF THE INVENTION

Figure 1:
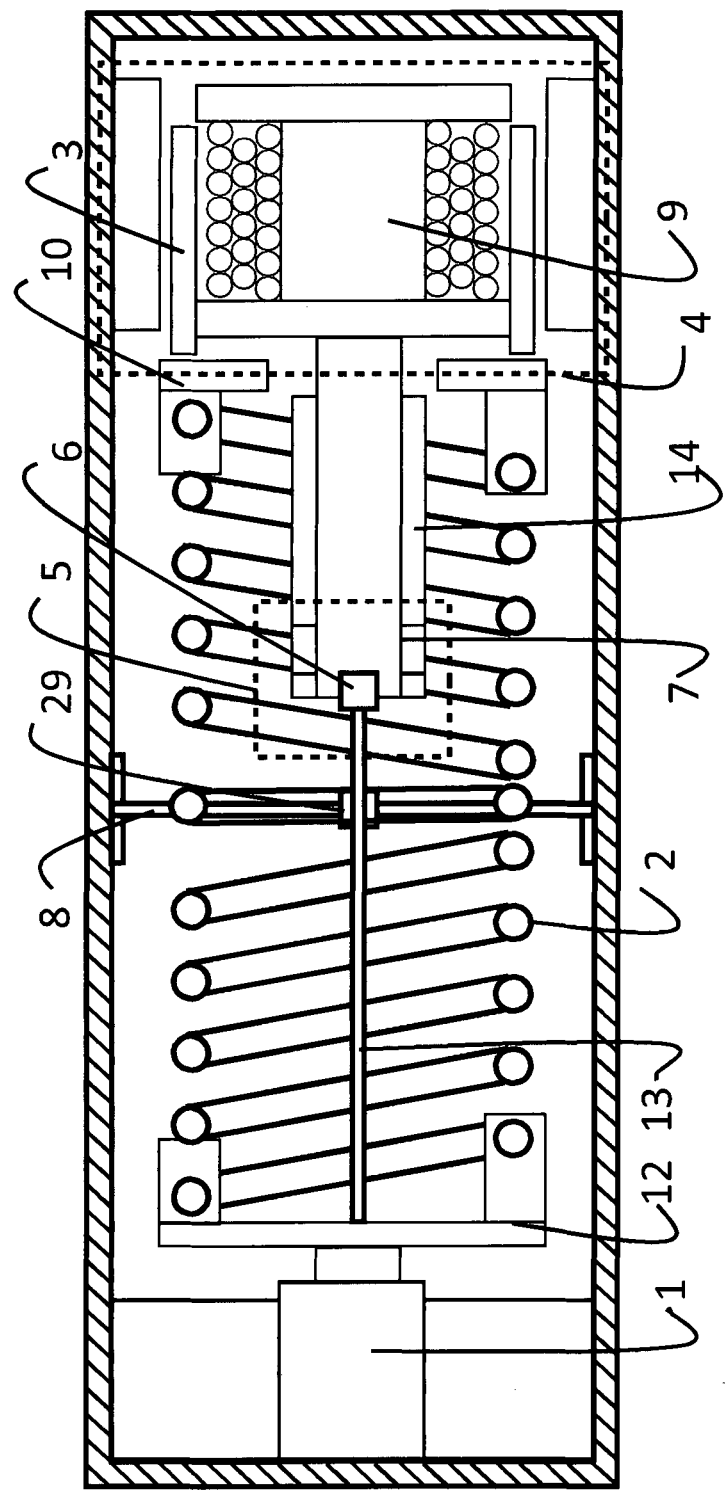
FIG. 1—an example of a mechanical construction of a linear actuator according to patent application PI 0601645-6, in which the element of mechanical actuation of interest is a movable part coupled through a resonant spring to a linear displacer that is another movable part of the assembly.

The system and method proposed herein have novel and inventive character when applied to a resonant linear motor construction as described in patent application PI 0601645-6 proved to be very advantageous—since in this type of construction (shown in FIG. 1 attached) the piston or element of mechanical actuation of interest 1 is coupled to a resonant spring 2 which is coupled to displacer 3 of the linear motor 4, forming two movable parts that oscillate at the same frequency, showing exact delay or nearly exact of 180° between the movements.

The invention uses a variation sensor of magnetic flux 5 as proposed in another patent application of the holder (filed on Jun. 6, 2011 under protocol number 018110021310) as the sole means to determine simultaneously the amplitude of displacement and the oscillation frequency of the displacer, using the characteristic of the type of construction to which it applies, which translates into an effective control element—since at the same time it allows the control of the exact stroke of oscillation of a movable part that does not have any direct coupling to the movable part of the motor and therefore allows the movable part of the motor to operate at the point of mechanical resonance.

Also as one of the advantages of the invention proposed herein which is translated by using the variation sensor of flux 5 coupled to the actuation element 1, which is the same sensor can also be used for detecting impacts, since it is rigidly coupled to the movable part that is impacted. This technique can be seen in said patent application 018110021310 cited above in this specification.

The variation sensor of magnetic flux 5 has, in fact, as direct output, a signal proportional to the speed of the actuator shaft. The construction of interest that is mentioned in the application 018110021310 has a small magnet 6 coupled to the final element of interest 1 and a fixed coil 7 which, through the law of magnetic induction Faraday-Lenz, is excited producing an electrical signal. Operating in a known fixed frequency, one has that the speed signal is directly proportional to the stroke, as its amplitude depends on three parameters: duration of oscillation and induction of the magnet (which are fixed) and the oscillation amplitude (which is variable).

By changing the frequency of operation by control means, one can feed back the system and reach a new stroke information on the above, correcting the time of oscillation.

Also from the teachings prior to the invention, it is known that the optimum operation of this type of motor occurs at the point of mechanical resonance, and that it can be checked when there is the current of the motor circulating in phase with the back electromotive force generated in the motor 4—which is in quadrature with the position of displacer 3 or in phase with the speed thereof.

The control actuation is performed by a control system 8 and the strategy is therefore the reading of the output signal of the induced, in the measurement of the amplitude of this signal, and upon comparing the same signal in time with the signal of current of the motor. By reading and interpreting these signals, the result of control system 8 is the frequency variation of the driving current by the control system to the point of operation, where both signals are in phase.

The system and control method according to the present invention are therefore advantageously applied to a linear actuator according to FIG. 1, comprising a linear motor 4 which in turn consists of a stator 9 and a linear displacer 3. This linear displacer 3 is coupled to a resonant spring 2 by a fastening means 10. This resonant spring 2, as disclosed in the patent application PI 0601645-6, has a central fastening point 29 and can be fastened by another type of spring or any other similar element.

This resonant spring 2 moves from the force generated by the linear motor 4 through the coupling mentioned above, and from its construction, the ends of this resonant springs 2 move in phase opposition. That is, when the motor 4 pushes the spring 2 to the right, considering the direction of the FIG. 1 shown, the opposite end moves to the left carrying with it the actuation element of interest in the case of FIG. 1, it is comprised of a piston 1 that is attached to the resonant spring 2 by the fastening means 12.

A shaft 13 which serves as basis for a magnet 6, which is allocated at its end is coupled to the piston 1 or to its fastening element 12 which is shown in FIG. 1 simplistically—however, which can be more complex. The magnet 6 moves in the same phase of the piston 1 and proximally to a coil 7 supported by a base or support 14, inducing an electrical voltage by the Law of Induction of Faraday-Lenz.

Figure 2:
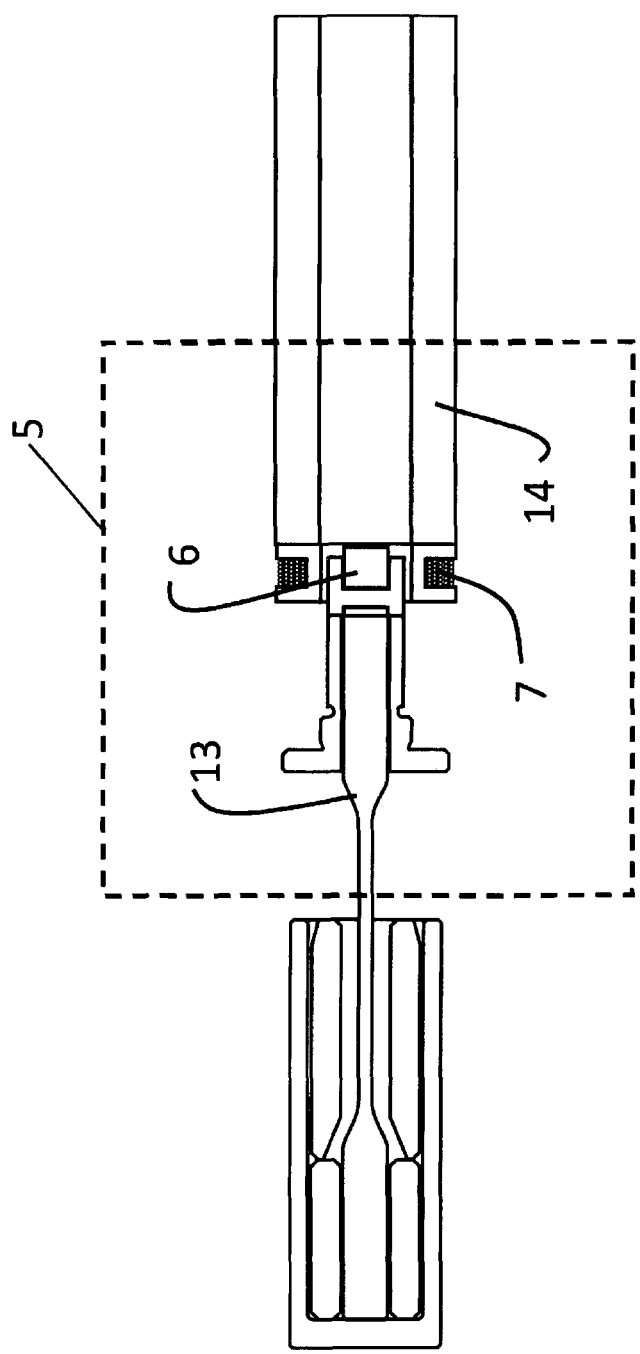
FIG. 2—a sectional image of an example of variation sensor of magnetic flux as proposed in the patent application filed on Jun. 6, 2011 under protocol number no 018110021310, and by which one can make the control of resonance and stroke of a construction of a linear actuator according to FIG. 1.

All this assembly that involves the rod 13, magnet 6, coil 7 and support 14 mentioned are represented in a possible constructive manner—and object of the patent application filed on Jun. 6, 2011 under protocol number 018110021310—in FIG. 2, identified as variation sensor of magnetic flux 5 and the elements of this sensor are identified by the same reference numerals already mentioned to facilitate understanding of its constituent elements.

Figure 6:
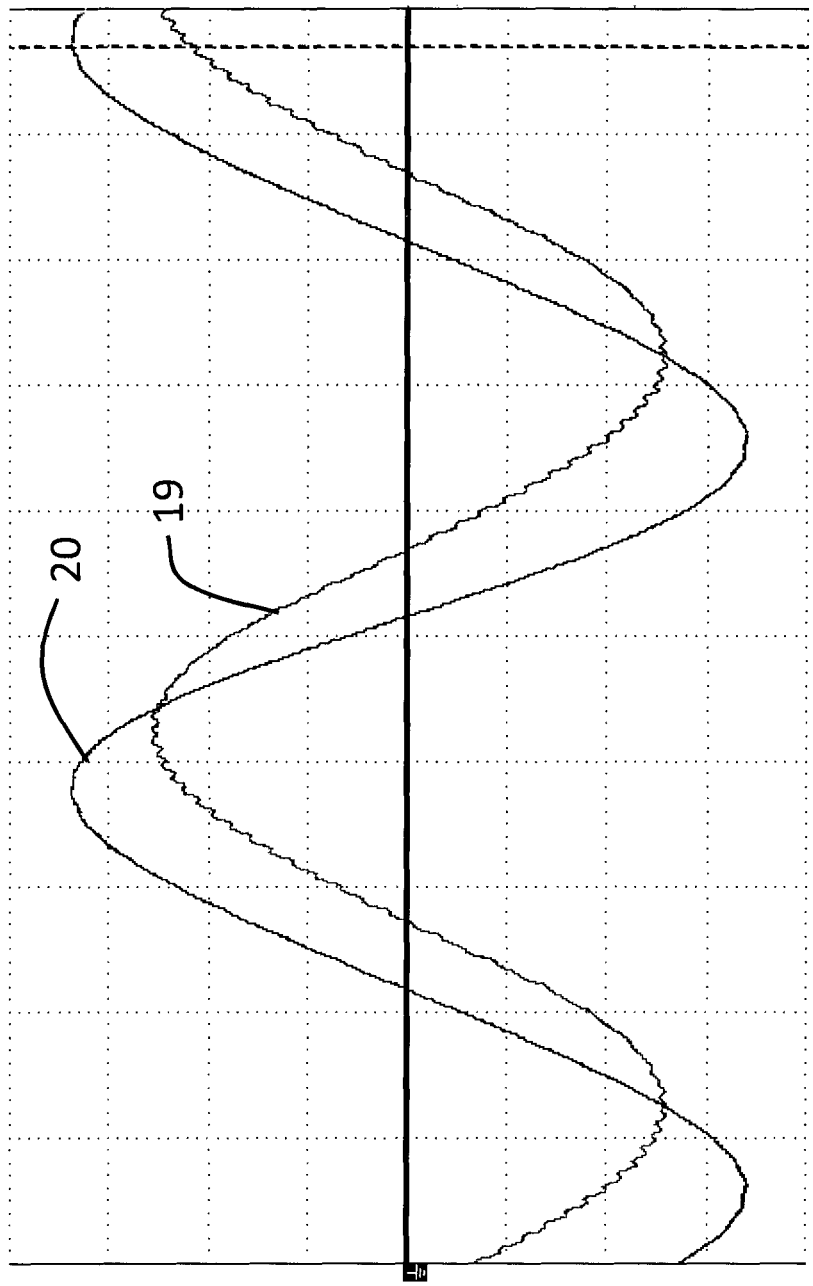
FIG. 6—a graph illustrating typical waveforms of the current of the motor of the linear actuator and the variation sensor of magnetic flux operating outside the resonant frequency in the same time base.
Figure 7:
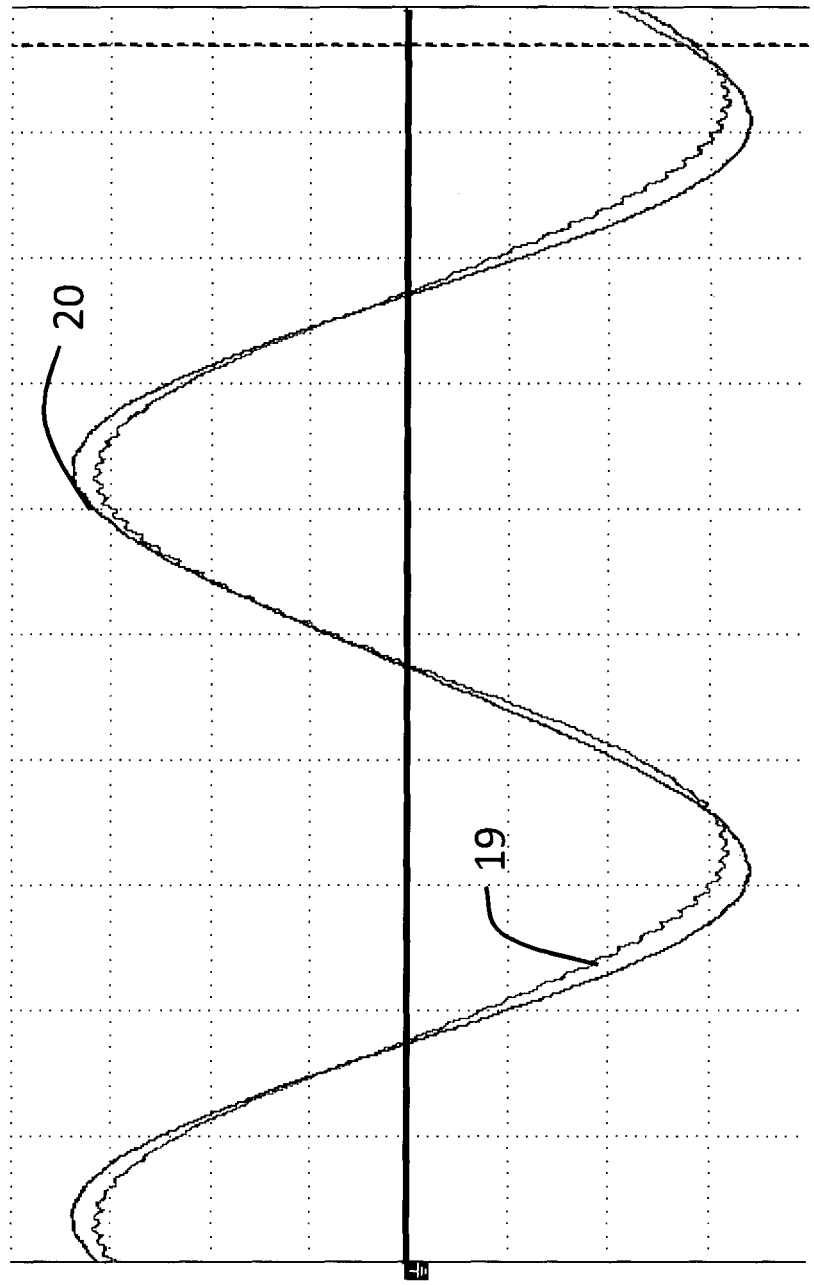
FIG. 7—a graph illustrating typical waveforms of the current of the motor of the linear actuator and the variation sensor of magnetic flux operating in the resonant frequency in the same time base.

The signal generated at the coil 7 of the variation sensor of flux 5 is, therefore, proportional to the variation of magnetic flux which concatenates the same. In FIGS. 6 and 7 are shown the waveforms of the signal, respectively indicated by 19 and 21. The points of maximum of the signal are the points where the magnet 6 of the sensor 5 has a higher speed—as a consequence, where the piston 1 has a higher speed—and the zero crossings represent the upper and lower dead points, that is, the end of the stoke of the resonant spring 2.

Figure 3:
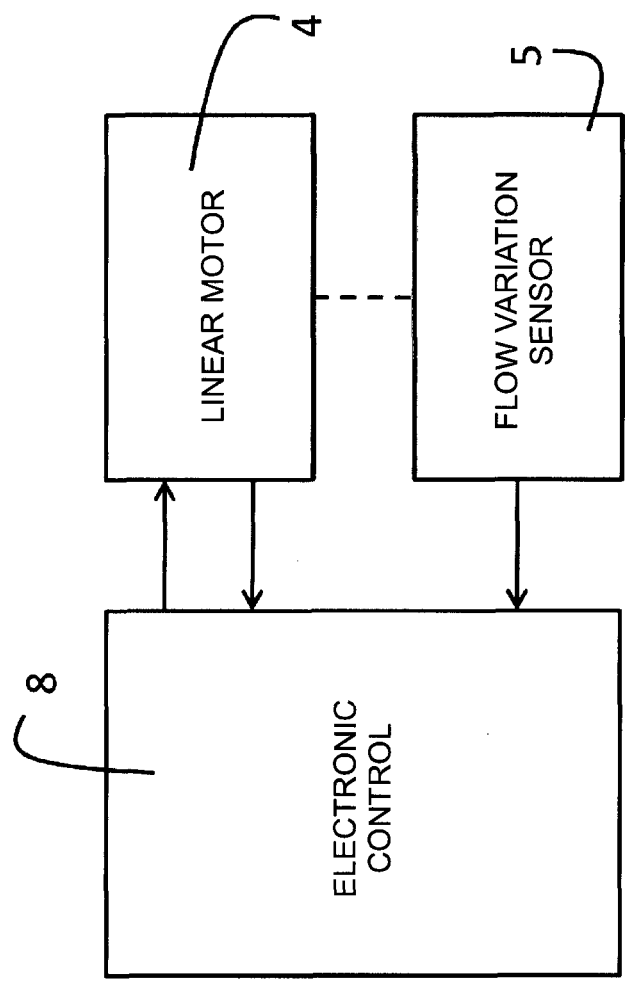
FIG. 3—a block diagram of control system of stroke and resonance constructed in accordance with a preferred embodiment of the present invention.

The control system 8 shown in the FIG. 3 receives this signal from the variation sensor of magnetic flux 5 illustrated in the same figure. The same control system 8 reads the current linear motor 4, also shown in FIG. 3. The current signal read by the control system 8 is also shown in FIGS. 6 and 7.

Figure 4:
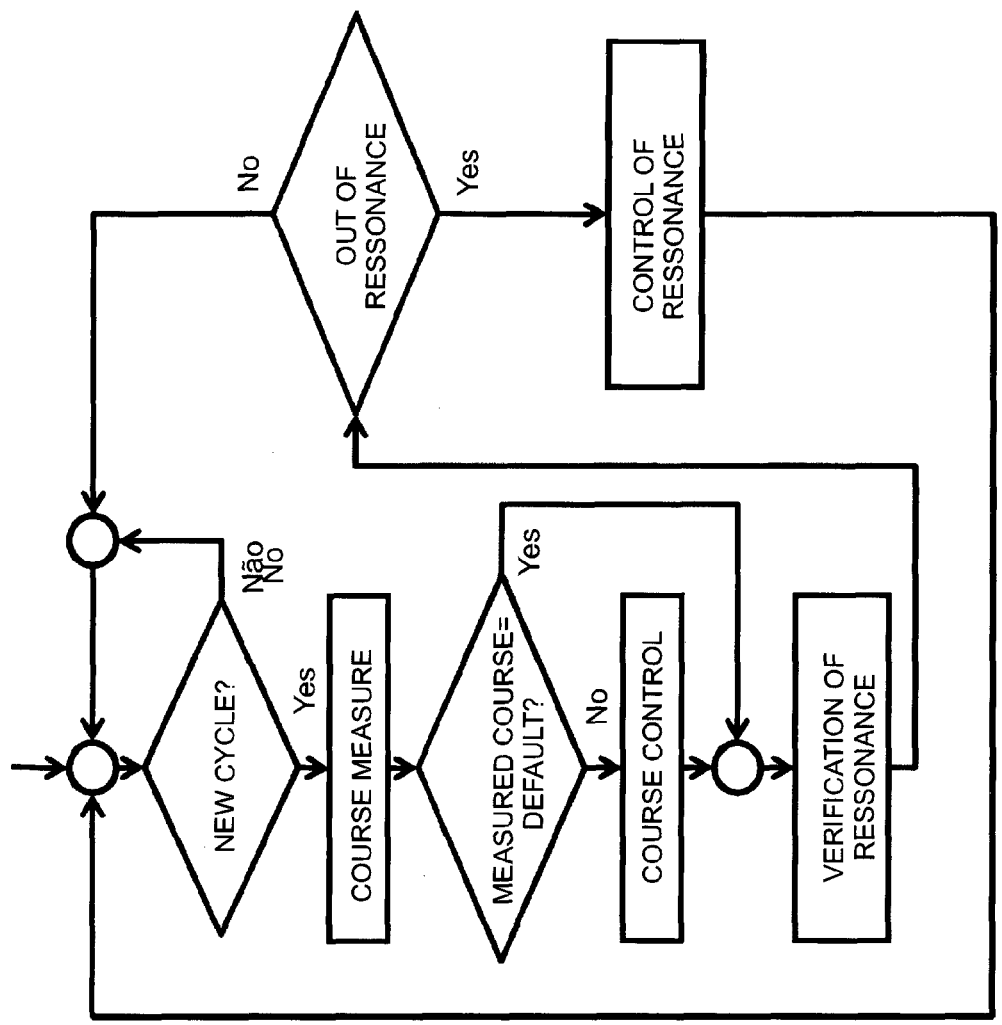
FIG. 4—an example of an algorithm to control the stroke and resonance of a linear actuator as shown in FIG. 1.

From these two signals received by the control system 8 and from a possible embodiment (but not single) of the circuit shown in FIG. 4, it is possible to generate a digital signal which is related to the displacement of the electric phase between the induced sensor signal and the signal of the motor current.

Figure 5:
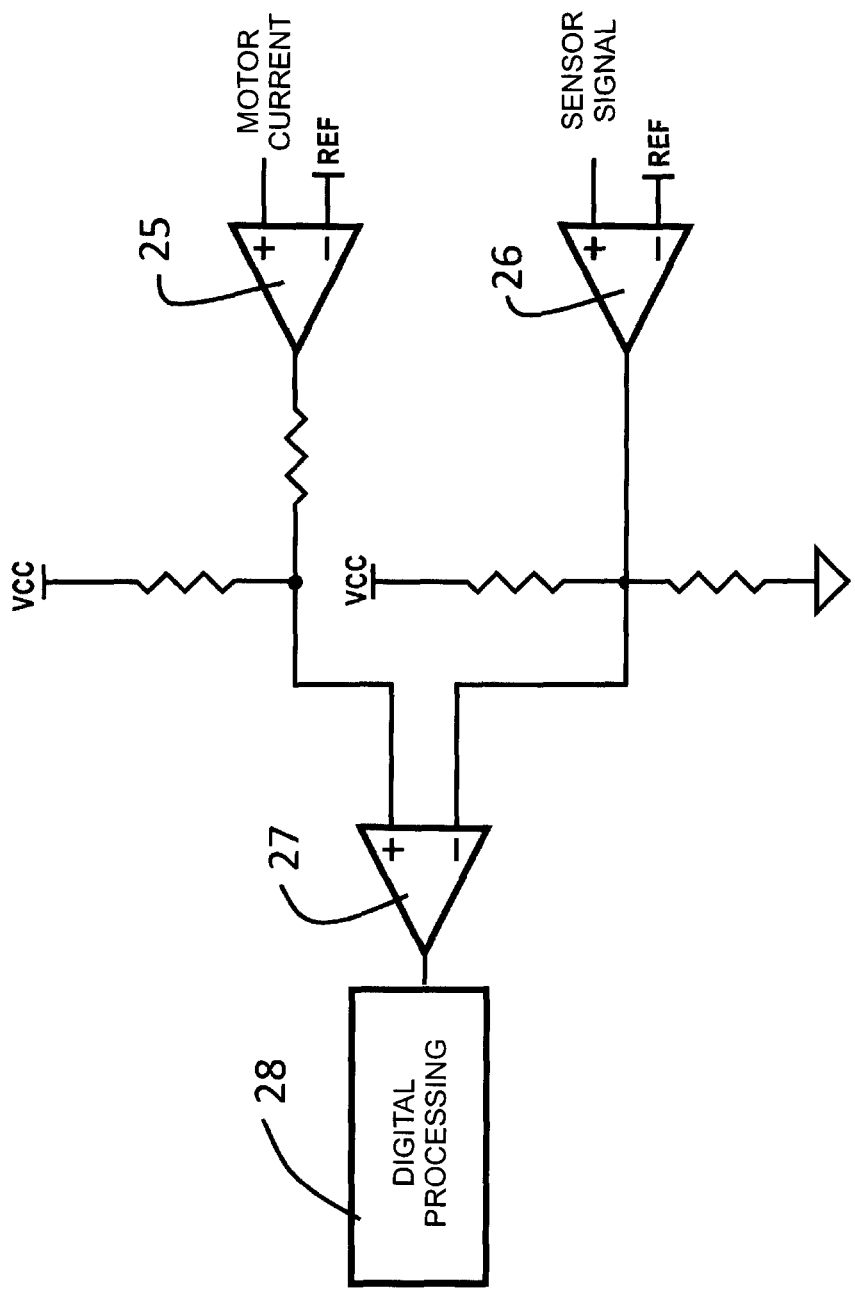
FIG. 5—an example of embodiment of a circuit for analyzing the delay between the signals of current of the variation sensor of magnetic flux.

Referring to FIG. 5, this embodiment has some advantages, for example, to provide digital signals unambiguously by the displacement of the analog level and a logical one. A minor variation between the comparison references permit to create asymmetric signals to further facilitate the generation of the comparison signal.

Parallel to this technique, others can be used, for example, the utilization of processors with a high rate of acquisition and analogue-to-digital conversion or dedicated converters, and from the direct reading of the signals to establish references for comparing the phases. The possible techniques are not limited here and they all have the same purpose—that is to evaluate the displacement of electric phase between the two signals.

Further exemplifying the method of resonance control, FIGS. 6 and 7 show two situations of operation of the linear actuator having features which justify the present patent application. In FIG. 6, it is easily observed that the current signal 20 and the signal of the variation sensor of flow 19 are electrically delayed identifying that the zero crossings of both the periodic signals that are at the same time base, occur at different times. This means that at this point the linear actuator is operating in frequency different from the resonant frequency and therefore does not operate in the region of maximum efficiency.

In FIG. 7, the same current signals 20 and the variation sensor of flux 19 present in electric phase as a result of the action control of the control system 8. As an example of the control method and, based on the embodiment of the circuit shown in FIG. 5, the FIG. 8 graphically displays the quantities of interest that are used within the algorithm control of stroke and resonance which is shown in FIG. 4.

Figure 8:
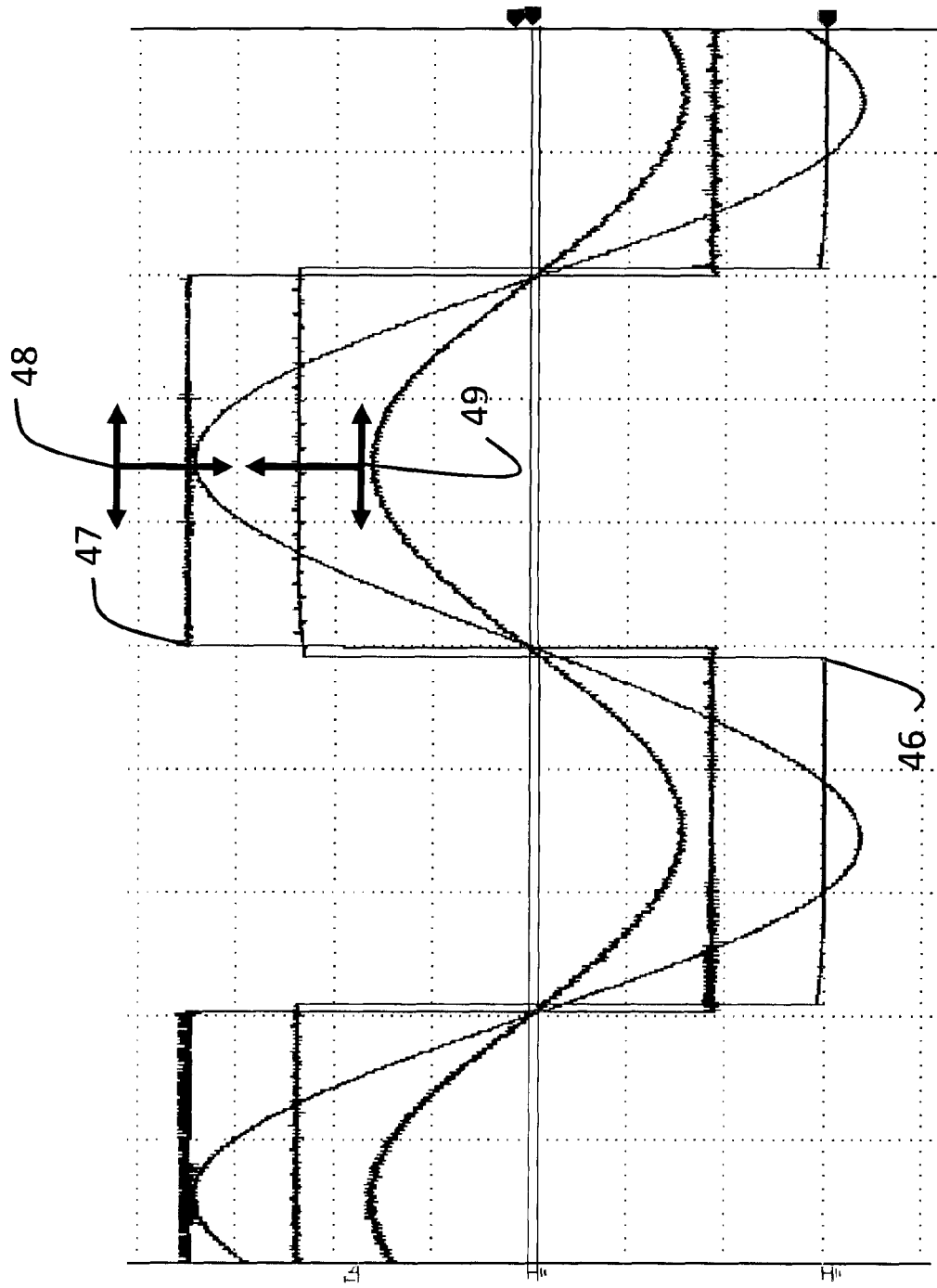
FIG. 8—graphical example of the performance of the example of embodiment of the circuit for analyzing the delay of signals shown in FIG. 5 together with the waveforms shown in FIG. 7.
Figure 9:
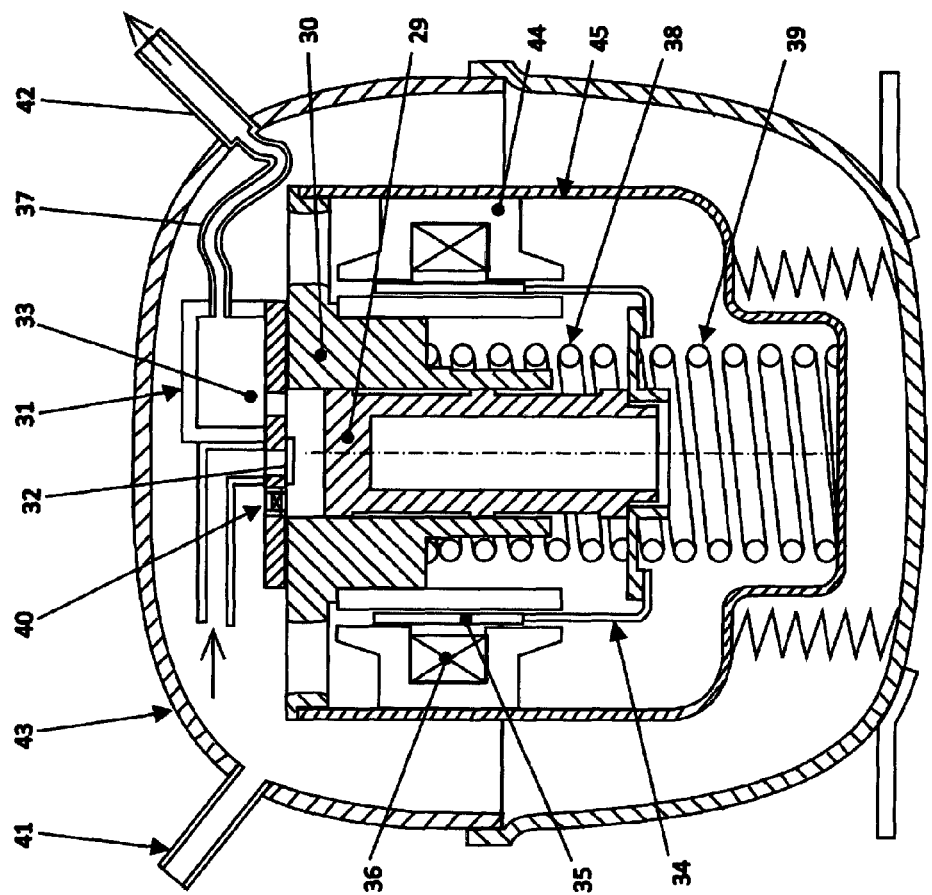
FIG. 9—a cross section of a linear compressor of the current state of the art, allowing the detailed visualization of all of its internal components.

From FIG. 8 (and also FIG. 5) it is possible to observe the waveform of the output signal 47 of current comparator 25 of the motor and, similarly, of the output signal 46 of the signal comparator of the sensor 26 when the actuator operates at resonance.

These signals, which have certain asymmetry with each other, on purpose to improve the review process, are all the time compared again by another comparator 27 generating a new pulsed signal in which the logic level matters. These pulses are analyzed by a processor 28 of the control system, which seeks to centralize the same end result. Once these pulses are centralized, there is met the resonance frequency. The arrows 48 and 49 graphically represent how the phenomenon occurs, that is, one of the signals is advanced or delayed relative to one another until they are centered.

The control system 8 then has the main action in the linear motor 4 to vary the frequency of the driving current of the motor 4 according to a predetermined control law in order to advance or delay the signal of the variation sensor of flux 5 and place it on phase with the current signal 25.

As it has already been mentioned, the present invention is advantageous in this type of construction, because it allows to control with accuracy the displacement of the mechanical actuation element of interest, in this case a piston 1, since the variable component of the variation sensor of flux 5 is rigidly coupled to the same piston 1 by means of a rod 13.

This control of the stroke, as previously reported, is achieved by direct analysis of the variation sensor of flux 5 by the control system 8. The amplitude of this signal gives an indirect information, but proportion and exact of the amplitude of the stroke for a fixed frequency. As the signal is proportional to the variation of flow, this means that the peak of the signal is measured proportional of the maximum speed of oscillation of the sensor; so for the same time of oscillation, the maximum speed can only be increased if the run distance increased, which means that the displacement of piston 46 (see FIG. 8) has increased.

However, this amplitude is variable as a function of the same stroke if the frequency varies, because from it to the same stroke there will have a different time to complete a same displacement. As the spring operates in an elastic region of operation, thus linear, and the activation occurs with very small variations of frequency as the resonant frequency is more dependent on the constructive characteristics of the spring than of the load and mass that it actuates, easily one can derive a law of adjustment and feedback to the control for a normalization of this signal and, then operate with a magnitude that corresponds effectively to the piston stroke.

It can be concluded from the foregoing that the present invention provides a method and system which allows effective and concomitant control of the stroke and resonance of a linear actuator of the type of the patent application PI 0601645-6 using the sensor of the patent application of protocol 018110021310.

Thus, another merit of this invention is the fact that all the benefits of the patent application filed on Jun. 6, 2011 under protocol number 018110021310 which relates to the detection of impact can be effectively applied to a actual product and would have as great advantage the use of a single sensor. Thus, a product which uses the benefits of this patent application and of the patent application of protocol 018110021310, would have the control of stroke, operation at resonance and detection of impact obtained from a single variation sensor of flux at a linear actuator of the patent application filed on Jun. 6, 2011 under protocol number 018110021310.

It is noteworthy that although there have been shown preferred constructive forms of the present invention, it is understood that eventual omissions, substitutions and constructive alterations can be made by a technician skilled in the subject matter, without departing from the spirit and scope of required protection. It is also expressly stated that all combinations of the elements that perform the same function in substantially the same way to achieve the same results are within the scope of the invention. Substitutions of elements of an embodiment described by others are also fully intended and contemplated.

It should however be understood that the description given based on the above figures refer only to some of the possible embodiments for the system of the present invention, and the actual scope of the present invention is set out in the appended claims.

The invention claimed is:

1. A system of control of stroke and operation at resonant frequency of a reciprocating compressor having a linear motor (4) comprising a stator (9) and a displacer (3), the motor (4) cooperating with a resonant spring (2) that is driven by the linear displacer (3) at one of the ends of the resonant spring with the opposite end of the resonant spring cooperating with mechanical actuation element (1), wherein said system comprises:
a magnetic flux variation sensor (5) cooperating with the resonant spring (2) and said variation sensor of magnetic (5) comprised by a fixed part and a movable part, the movable portion coupled to the end of the resonant spring (2) opposite to the end of the resonant spring cooperating with the linear displacer (3),
wherein the magnetic flux variation sensor (5) is the sole means required to determine the displacement amplitude and the frequency of oscillation of a displacer (3) of linear motor (4).

2. The system according to claim 1, wherein the variation sensor of magnetic flux (5) comprises a coil (7) supported by a support base (14) and a magnet (6) cooperating with the coil (7), wherein said magnet (6) generates a voltage induced in the coil (7).

3. The system according to claim 2, wherein the movable part of the variation sensor of magnetic flux (5) comprises a magnet (6) integral to one end of a rod (13) whose opposite end is fixed to a fastening means (12) which connects the resonance spring (2) to the mechanical actuation element (1).

4. The system according to claim 2, wherein performing control of the stroke of the mechanical actuation element (1) is done by using the signal of the variation sensor of magnetic flux (5) induced.

5. The system according to claim 1, wherein the mechanical actuation element (1) comprises a piston.

6. A method for control of stroke and operation in the resonant frequency of a resonant linear motor, said linear motor (4) comprising a stator (9) and a linear displacer (3), the motor (4) cooperating with a spring resonant (2) that is driven by the linear displacer (3) at one of the ends of the resonant spring having the opposite end of the resonant spring cooperating with mechanical actuation element (1), the method comprising:
generating, by said linear displacer (3) of a force on the end of the resonance spring (2) with which the linear displacer (3) cooperates, so that when the resonant spring (2) has the end cooperating with the linear displacer (3) displaced in one direction, its opposite end moves in the opposite direction;
receiving the signal from a variation sensor of magnetic flux (5) having its movable part coupled to the resonant spring (2) at the opposite end of the linear displacer (3);
performing reading of the current of the linear motor (4);
controlling the operation of mechanical resonance frequency from the signal generated by the variation sensor of magnetic flux (5) and of the current signal of the linear motor (4); and
controlling the stroke of the linear actuator from the signal generated by the variation sensor of magnetic flux (5) and the current signal of the linear motor (4) simultaneously to the control of operation at frequency of mechanical resonance.

7. The method according to claim 6, further comprising evaluating, via an evaluation, the delay between the signal of the variation sensor of magnetic flux (5) and the current signal of the linear motor (4).

8. The method according to claim 7, wherein from the evaluation of the delay of the signals of the variation sensor of magnetic flux (5) and of the current of the linear motor (4) there is comprised the frequency variation of the current of the linear motor (5) until the signal of the variation change of magnetic flux (5) lie in phase with the signal of current of the linear motor (5).

9. The method according to claim 8, further comprising the variation in the driving frequency of the current of the linear motor (5) until the signs are delayed by 0 or 180 degrees, or close to these values.

10. The method according to claim 8, wherein, according to a law of adjustment, it feeds back information of the operating frequency to adjust the stroke information for various operating frequencies.

11. The method according to claim 6, further comprising generating a digital signal which is related to the phase displacement of electric phase between the signal of the variation sensor of magnetic flux (5) and the current signal of the linear motor (4).

12. The method according to claim 6, further comprising evaluating the displacement of electric phase between the signal from a variation sensor of magnetic flux (5) and the current signal of the linear motor (4).

* * * * *